(12) United States Patent
Witzel

(10) Patent No.: US 6,966,253 B2
(45) Date of Patent: Nov. 22, 2005

(54) FLAVOR WAVE PLATE FOR BARBECUES AND COMBINATION OF FLAVOR WAVE PLATE AND BARBECUE

(75) Inventor: Theodore A. Witzel, Kitchener (CA)

(73) Assignee: Onward Multi-Corp Inc., Kitchener (CA)

( * ) Notice: Subject to any disclaimer, the term of this patent is extended or adjusted under 35 U.S.C. 154(b) by 0 days.

(21) Appl. No.: 10/054,893

(22) Filed: Jan. 25, 2002

(65) Prior Publication Data

US 2003/0140799 A1 Jul. 31, 2003

(51) Int. Cl.⁷ ............................................. A47J 37/07
(52) U.S. Cl. ........................... 99/400; 99/407; 99/446; 99/447
(58) Field of Search .......................... 99/400, 401, 445, 99/446, 447, 450; 126/25 R, 41 R, 51, 39 J

(56) References Cited

U.S. PATENT DOCUMENTS

| 2,881,695 | A | * | 4/1959 | Pietro .......................... 99/446 |
| 5,617,778 | A | * | 4/1997 | Schroeter et al. ............. 99/446 |
| 5,755,154 | A | | 5/1998 | Schroeter et al. |
| 6,176,173 | B1 | | 1/2001 | Holbrook et al. |

* cited by examiner

*Primary Examiner*—Reginald L. Alexander
(74) *Attorney, Agent, or Firm*—Daryl W. Schnurr

(57) ABSTRACT

A V-shaped flavor plate is used in a barbecue in place of briquettes. The V-shaped flavor plate has three inverted V-shaped sections forming three peaks and two valleys. A plurality of spaced oblong openings are located along a lowermost surface of the valleys. The openings are separated by ridges that prevent the collection of flammable liquids.

11 Claims, 3 Drawing Sheets

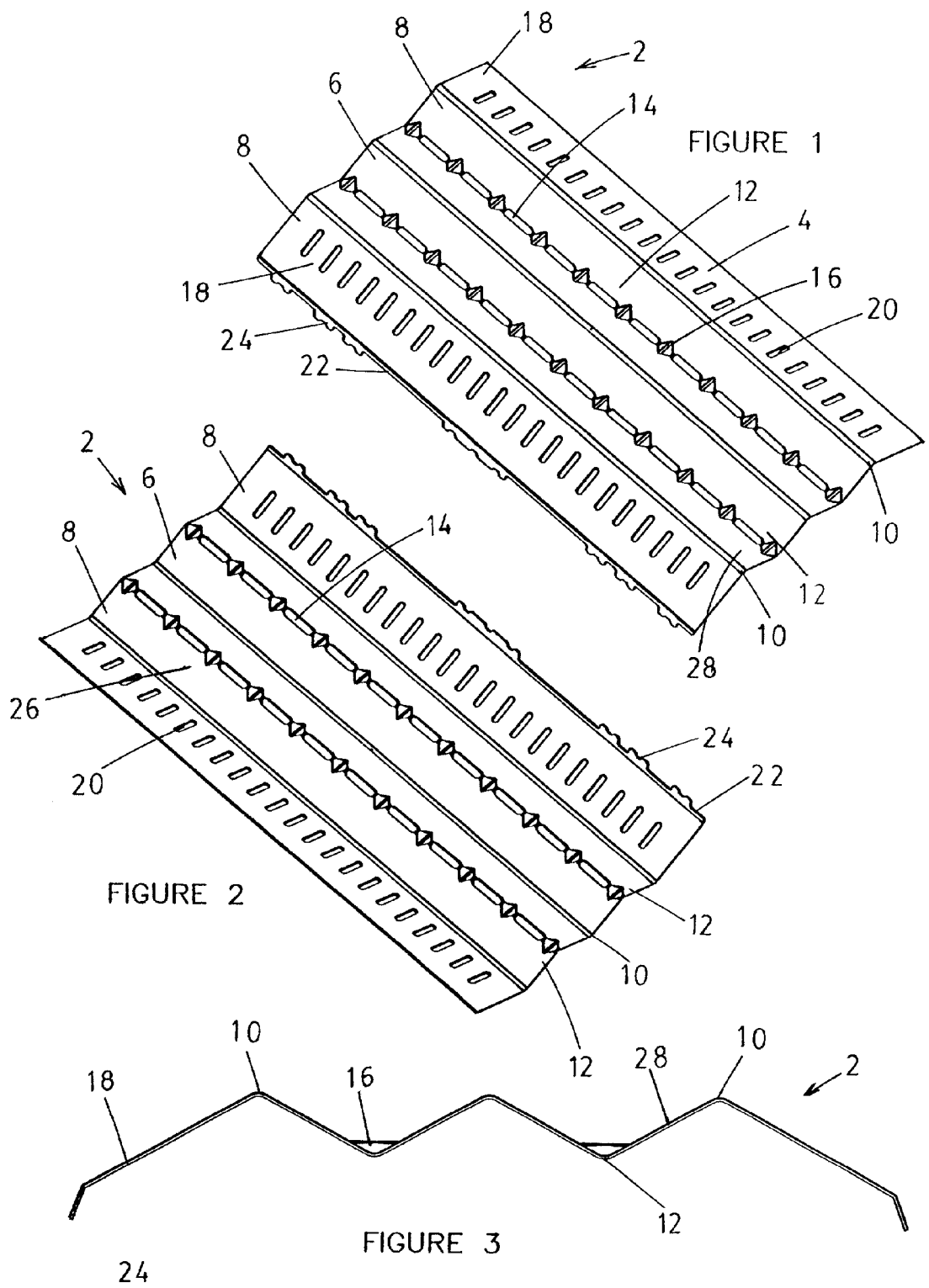

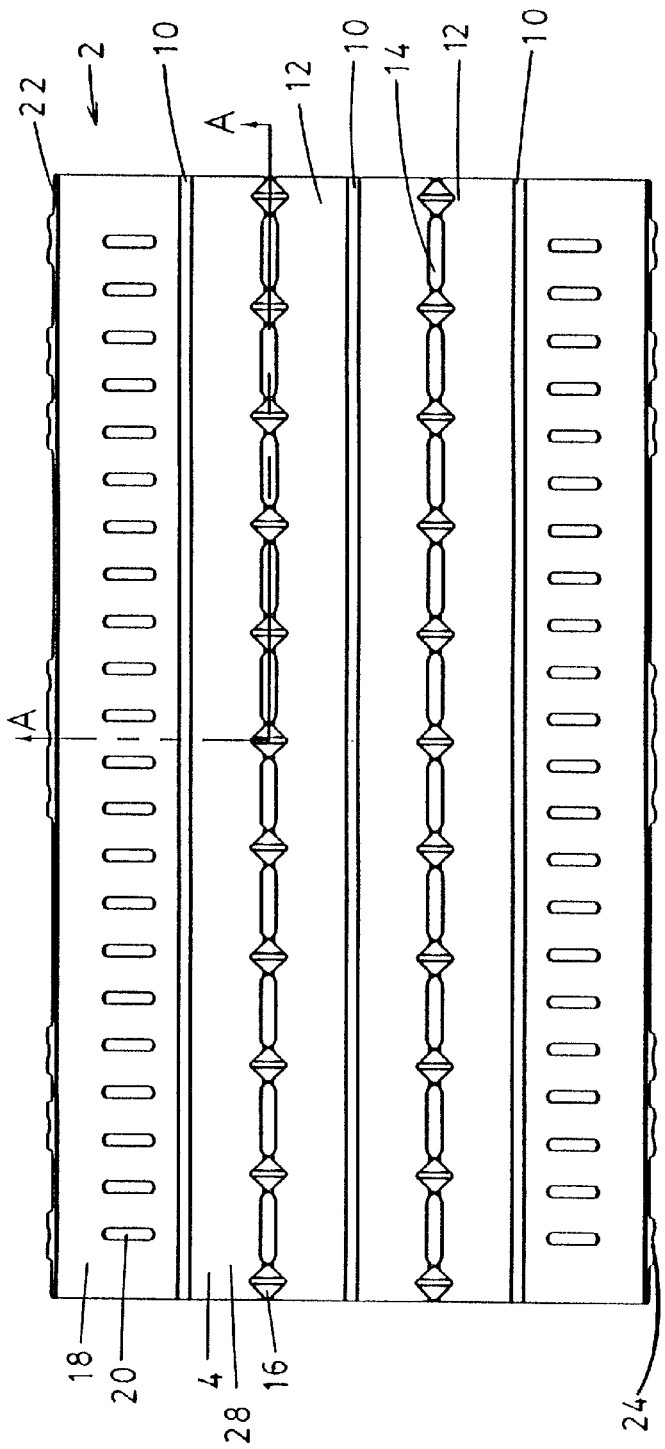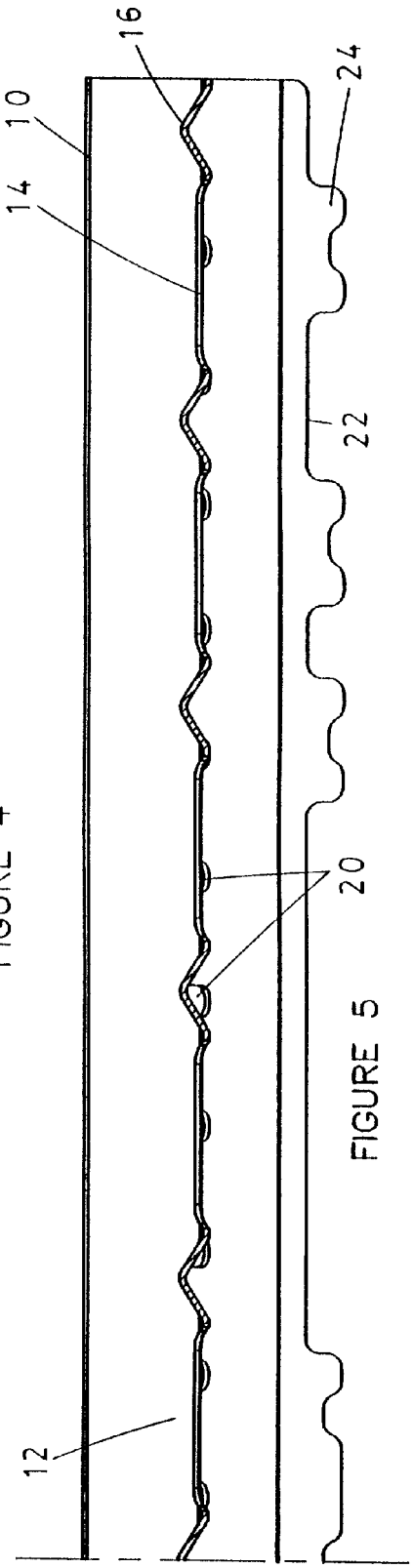

FLAVOR WAVE PLATE FOR BARBECUES AND COMBINATION OF FLAVOR WAVE PLATE AND BARBECUE

BACKGROUND OF THE INVENTION

1. Field of Invention

This invention relates to a flavor plate for use in a gas barbecue and to a flavor plate and gas barbecue in combination.

2. Description of the Prior Art

It is known that a flavor plate can be used in place of briquettes or other heat retention means for gas barbecues. It is also known to provide a flavor plate that has three inverted V-shaped sections. Such flavor plates have openings therein to allow heat from a burner of a barbecue to flow directly from said burner to food being cooked on the grill. While the flavor plates can be used to replace briquettes in a gas barbecue, there is a tendency with previous V-shaped flavor plates for fats and juices from the food being cooked to collect in liquid form between openings extending along a lowermost surface of a valley of the flavor plate. This collection of fats and juices tends to cause flare ups. Flare ups can be dangerous and can also cause food that is being cooked on the grill of the barbecue to become burned.

SUMMARY OF THE INVENTION

It is an object of the present invention to eliminate or at least substantially reduce flare ups that occur when the flavor plate is used in a gas barbecue.

A flavor plate is used in a gas barbecue and is located between a grill and a burner of the barbecue. The flavor plate has at least two inverted V-shaped sections located side by side. The at least two sections form at least two peaks and one valley. The valley is located between the peaks. The valley has a plurality of spaced first openings along a lowermost surface thereof with a ridge located between each of the openings. The ridge is sized and shaped to cause any fluid on the ridge to flow into at least one of the openings as each ridge is sloped to one or more first openings located adjacent to each ridge.

A flavor plate and barbecue in combination, the combination comprises a flavor plate mounted between a burner and a grill of the barbecue. There are no briquettes in the barbecue. The flavor plate has at least two inverted V-shaped sections located side by side relative to one another. The at least two sections form at least two peaks and one valley. The valley has a lowermost surface with spaced first openings extending along the lowermost surface and ridges located between each of the first openings. The ridges slope down to any first opening on either side of each ridge. The barbecue has a channel to direct a fluid passing through the first openings to a channel to prevent the fluid from dripping onto the burner.

BRIEF DESCRIPTION OF THE DRAWINGS

In FIG. 1, there is shown a perspective view from a top of a flavor plate;

FIG. 2 is a perspective view of a flavor plate from a bottom;

FIG. 3 is a sectional end view of the flavor plate of FIGS. 1 and 2;

FIG. 4 is a top view of the flavor plate;

FIG. 5 is a sectional view along the lines A—A of FIG. 4;

DESCRIPTION OF A PREFERRED EMBODIMENT

Figure 6:
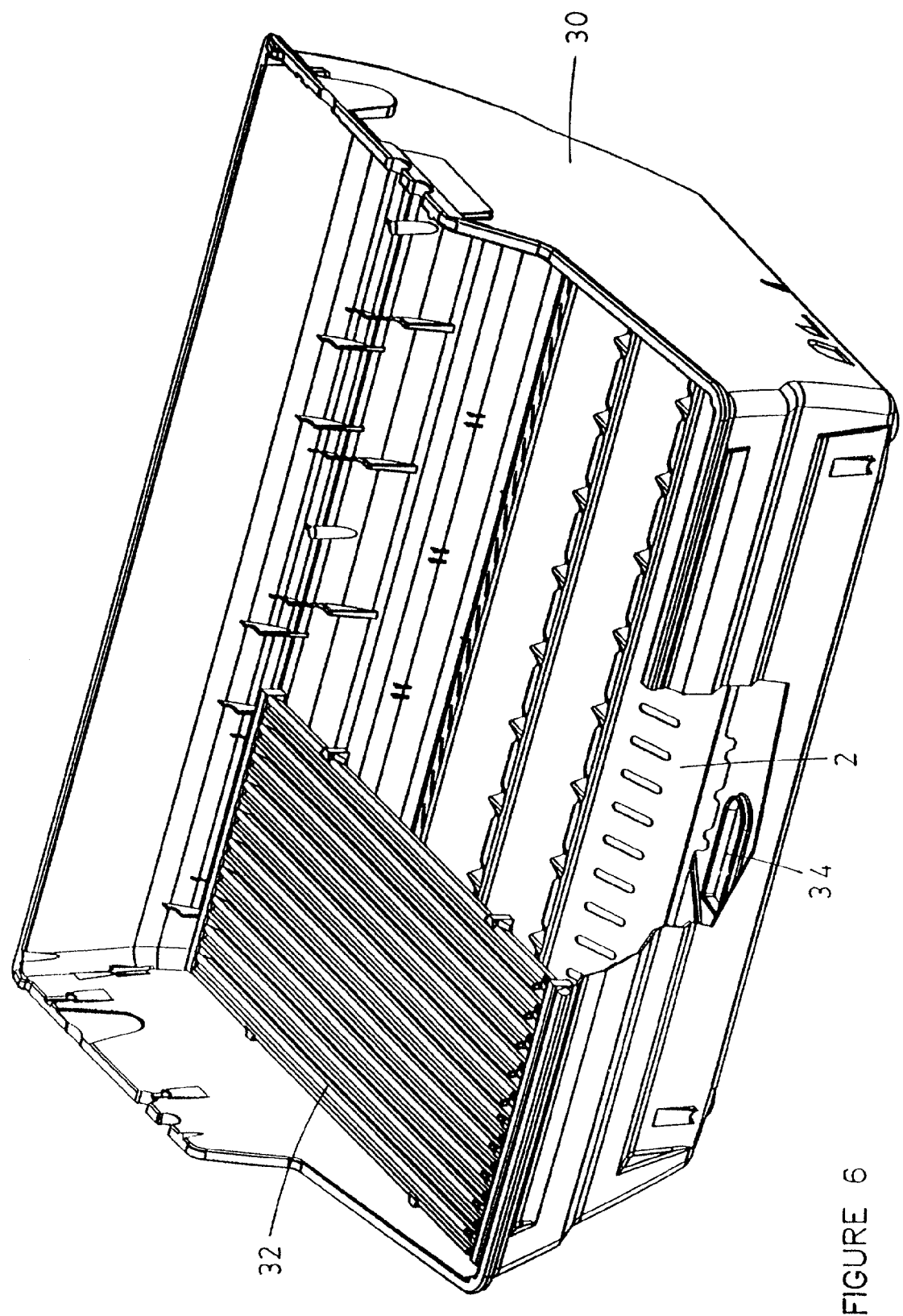
FIG. 6 is a perspective partially cutaway portion of a barbecue having a flavor plate mounted therein.

In FIG. 1, a flavor plate 2 has an upper surface 4 with a central inverted V-shaped section 6 and two outer inverted V-shaped sections 8. The sections are located side by side relative to one another and the flavor plate 2 is made of one piece. Preferably, the flavor plate 2 is made from stainless steel or porcelainized steel. The plate 2 has three peaks 10 and two valleys 12. There are a plurality of first openings 14 extending along a lowermost surface of the valleys 12. The first openings 14 are spaced apart from one another and have an oblong shape. The first openings 14 extend longitudinally along a lowermost surface of each of the valleys 12. There are a plurality of ridges 16 with one ridge being located between two adjacent first openings 14. It can be seen that there is a ridge located at each end of the plate that is adjacent to only one of the first openings 14. The plate has outer portions 18 located along each side that extend downward and outward and form part of the outer inverted V-sections 8. The outer portions 18 have a plurality of second openings 20 located therein. The second openings also have an oblong shape but extend laterally across the outer portions 18. One side edge 22 of the plate 2 has connectors 24 located thereon to enable the plate to be connected into the barbecue (not shown in FIG. 1).

In FIG. 2, it can be seen that the plate 2 has a lower surface 26. The same reference numerals are used in FIG. 2 to describe those components that are identical to the components of FIG. 1 without further description.

In FIG. 3, it can be seen that the connectors 24 are located along each of the side edges 22. It can also be seen that the outer portions 18 are longer than the inner portions 28 of the outer V-shaped sections 8. The ridges 16 are located along the valleys 12 between the central V-shaped section 6 and the outer V-shaped sections 8. The same reference numerals are used in FIG. 3 to describe those components that are identical to the components of FIGS. 1 and 2.

In FIG. 4, there is shown a top view of the flavor plate 2. The same reference numerals are used in FIG. 4 to describe those components that are identical to the components of FIGS. 1, 2 and 3.

FIG. 5 is a sectional view of the plate 2 through lines A—A of FIG. 4. The same reference numerals are used in FIG. 5 to describe those components that are identical to the components of FIG. 4.

FIG. 6 shows the flavor plate and barbecue in combination. In FIG. 6, the flavor plate 2 is mounted in a shell of a barbecue 30 between a grill 32 and a burner 34. The lid of the barbecue has been omitted and the shell, grill and burner are conventional. It can be seen that the plate 2 extends between the grill and burner so that any fats and juices that fall on the plate from food (not shown) being cooked on the grill will flow down the sloped surfaces of the plate. Most of the fats and juices will be vaporized on contact as the plate becomes very hot from the heat of the burner. The vaporized juices will flavor the food being cooked or barbecued. Some of the fats and juices will fall through the openings 14, 20 where they are channeled to a central collector. The channels and collector are not shown. The burner is protected from the fats and juices, thereby extending the life of the burner. Flare ups are prevented as the fats and juices cannot collect anywhere. The ridges 16 prevent the fats and juices from pooling along the lowermost surface of the valleys. The flavor plate evenly distributes the heat from the burner throughout the barbecue. The first openings and the second openings allow a direct path from the burner to the food being cooked. The connectors 24 line up with ribs (not shown) in the barbecue allowing for easy installation of the plate.

The briquettes and wire briquette grate are eliminated from the barbecue and replaced by the flavor plate.

I claim:

1. A flavor plate for use with a gas barbecue, said plate extending between a grill and a burner of said barbecue, said flavor plate comprising at least two inverted V-shaped sections located side by side relative to one another, said at least two sections together forming at least two peaks and one valley, said valley being located between said peaks, said valley having a plurality of spaced first openings along a lowermost surface thereof with a ridge located between each of said first openings, there being a plurality of ridges, each ridge sloping to one or more first openings located adjacent to each ridge.

2. A flavor plate as claimed in claim 1 wherein said plate has three inverted V-shaped sections with three peaks and two valleys, said plate having an outer portion along each side, each of said outer portions sloping downward and outward, each of said outer portions having a plurality of second openings therein.

3. A flavor plate as claimed in claim 1 wherein there is a central inverted V-shaped section and two outer inverted V-shaped sections, each outer section having an outer portion that slopes downward and outward from a peak, said outer portions of said outer V-shaped sections being substantially longer than an inner portion of said outer V-shaped sections.

4. A flavor plate as claimed in claim 3 wherein said outer portions contain a plurality of oblong second openings therein, said oblong second openings extending laterally on said outer portions.

5. A flavor plate as claimed in claim 1 wherein said first openings along a lowermost surface of said valley have an oblong shape and extend longitudinally along said lowermost surface.

6. A flavor plate as claimed in claim 1 wherein said ridges have a sloped surface, said sloped surface extending to a first opening that is adjacent to each ridge.

7. A flavor plate as claimed in claim 4 wherein said flavor plate has an outer edge extending along each side, each outer edge having connectors thereon, said connectors being sized and located to connect said flavor plate to said barbecue.

8. A flavor plate and barbecue in combination, said combination comprising a flavor plate mounted between a burner and a grill of said barbecue, there being no briquettes in said barbecue, said flavor plate having at least two inverted V-shaped sections located side by side relative to one another, said at least two sections forming at least two peaks and one valley, said valley having a lowermost surface with spaced first openings extending along said lowermost surface and ridges located between each of said first openings, said ridges sloping down to any first opening on either side of each ridge, said barbecue having a channel to direct a fluid passing through said first openings to a channel to prevent said fluid from dripping onto said burner.

9. A flavor plate and barbecue in combination as claimed in claim 8 wherein the plate has three inverted V-shaped sections with three peaks and two valleys, said plate having an outer portion along each side, each of said outer portions sloping downward and outward, each of said outer portions having a plurality of second openings therein.

10. A flavor plate and barbecue in combination as claimed in claim 8 wherein said ridges have a sloped surface, said sloped surface extending to a first opening that is adjacent to each ridge.

11. A flavor plate and barbecue in combination comprising a flavor plate mounted between a burner and a grill of said barbeque, wherein said plate has a central inverted V-shaped section and two outer inverted V-shaped sections, each outer section having an outer portion that slopes downward and outward from a peak, said outer portions of said outer V-shaped sections being substantially longer than an inner portion of said outer V-shaped sections.

* * * * *